United States Patent
Li et al.

(10) Patent No.: US 11,238,310 B2
(45) Date of Patent: Feb. 1, 2022

(54) TRAINING DATA ACQUISITION METHOD AND DEVICE, SERVER AND STORAGE MEDIUM

(71) Applicant: Baidu Online Network Technology (Beijing) Co., Ltd, Beijing (CN)

(72) Inventors: Su Li, Beijing (CN); Libo Fu, Beijing (CN)

(73) Assignee: Baidu Online Network Technology (Beijing) Co., Ltd., Beijing (CN)

( * ) Notice: Subject to any disclaimer, the term of this patent is extended or adjusted under 35 U.S.C. 154(b) by 0 days.

(21) Appl. No.: 17/164,112

(22) Filed: Feb. 1, 2021

(65) Prior Publication Data
US 2021/0182611 A1 Jun. 17, 2021

Related U.S. Application Data

(63) Continuation of application No. 16/050,288, filed on Jul. 31, 2018, now Pat. No. 10,936,906.

(30) Foreign Application Priority Data

Sep. 29, 2017 (CN) .......................... 201710912302.X (51) Int. Cl.
*G06K 9/62* (2006.01)
*G06F 16/58* (2019.01)
(52) U.S. Cl.
CPC ........... *G06K 9/6256* (2013.01); *G06F 16/58* (2019.01); *G06K 9/6262* (2013.01); *G06K 9/6267* (2013.01); *G06T 2207/20081* (2013.01)

(58) Field of Classification Search
CPC combination set(s) only.
See application file for complete search history.

(56) References Cited

U.S. PATENT DOCUMENTS 8,923,655 B1 * 12/2014 Weston .................. G06F 16/54
382/305
8,995,716 B1 * 3/2015 Zomet ................ G06K 9/00664
382/103

(Continued)

FOREIGN PATENT DOCUMENTS

CN 101116072 A 1/2008
CN 103279504 A 9/2013

(Continued)

OTHER PUBLICATIONS

Second Office Action dated Jun. 17, 2020 issued in connection with corresponding Chinese Application No. 201710912302.X.

(Continued)

*Primary Examiner* — Helen Zong
(74) *Attorney, Agent, or Firm* — Akerman LLP (57) ABSTRACT

A training data acquisition method and device, a server and a storage medium are provided. The training data acquisition method is applied to a classifier and includes the following steps: obtaining an image search target according to an input of a user; providing images to the user according to the image search target, to display the images; and selecting at least one image from the displayed images, and determining a target-classification pair as training data according to the at least one image; where the target-classification pair includes the image search target and an entity-based classification of the at least one image.

15 Claims, 2 Drawing Sheets

(56) References Cited

U.S. PATENT DOCUMENTS

2016/0224593 A1\* 8/2016 Qiu .................. G06F 16/583
2016/0342859 A1\* 11/2016 Rajaram ............. G06K 9/6202
2017/0329804 A1\* 11/2017 Fu .................. G06F 16/5866

FOREIGN PATENT DOCUMENTS

| CN | 103412881 A | 11/2013 |
| CN | 103810241 A | 5/2014 |
| CN | 105612514 A | 5/2016 |
| CN | 106021364 A | 10/2016 |
| CN | 106339756 A | 1/2017 |

OTHER PUBLICATIONS

Search Report dated Jun. 10, 2020 issued in connection with corresponding Chinese Application No. 201710912302.X.
First Office Action dated Sep. 23, 2019 for Chinese Application No. 201710912302.X.
Search Report dated Sep. 11, 2019 for Chinese Application No. 201710912302.X.

\* cited by examiner

TRAINING DATA ACQUISITION METHOD AND DEVICE, SERVER AND STORAGE MEDIUM

CROSS-REFERENCE TO RELATED APPLICATION

The present application is a continuation of U.S. patent application Ser. No. 16/050,288, filed on Jul. 31, 2018, which claims the benefit of priority to Chinese Patent Application No. 201710912302.X, filed before the State Intellectual Property Office on Sep. 29, 2017, and entitled "Training data acquisition method and device, server and storage medium," which is incorporated in the present application by reference in its entirety.

TECHNICAL FIELD

The present application relates to a classifier, and more particularly to a training data acquisition method and a device, a server, and a storage medium for a query intent classifier of an online search system.

BACKGROUND

A search intent classifier of an online search system of a commercial search engine (such as Baidu, Google, and So) is a crucial module to perform traffic analysis and detailed sorting. Generally, the intent classifying is performed by manually labeling training data for obtaining a classifier by training. Currently the search result of an image is sorted mainly according to features such as the correlation between texts regarding the image and the search text, and a cumulative click number and so on, with little considering the direct correlation of the image and the search per se. Manual labeling is costly, and barely covers the long-tail scene, such that it is difficult to match the classification with an image effectively and broadly.

SUMMARY OF THE APPLICATION

The present application has been made in view of the above problems of the related art, and at least one advantageous option is provided for overcoming or alleviating one or more problems existing in the related art.

To achieve the above object, according to an aspect of the present application, there is provided a training data acquisition method which is applied to a classifier, including the following steps: obtaining an image search target according to an input of a user; providing images to the user according to the image search target, to display the images; and selecting at least one image from the displayed images, and determining a target-classification pair as training data according to the at least one image; wherein the target-classification pair includes the image search target and an entity-based classification of the at least one image.

According to an embodiment of present application, the selecting at least one image from the displayed images, and determining a target-classification pair as training data includes: selecting at least one image from the displayed images multiple times; determining the target-classification pair for the at least one image each time; and grouping the target-classification pairs to obtain a target-classification group, and determining the target-classification group as training data, wherein the target-classification group includes the image search target, and the entity-based classifications included in the determined target-classification pairs. Here, the selecting at least one image from the displayed images, and determining a target-classification pair as training data may further includes: determining an image related to an untrusted click each time; filtering out the image related to the untrusted click from the at least one image selected each time, and determining the target-classification pairs according to a filtering result; and evaluating accuracy of each of the target-classification pairs; and determining the training data according to the accuracy of each of the target-classification pairs.

According to an embodiment of present application, the selecting at least one image from the displayed images and determining a target-classification pair as training data includes: determining an image related to an untrusted click; filtering out the image related to the untrusted click from the at least one image, and determining the target-classification pair according to a filtering result; and evaluating accuracy of the target-classification pair, and determining the training data according to the accuracy.

According to an embodiment of present application, the target-classification group includes a ratio of the number of images in each entity-based classification included in the determined target-classification pairs to the number of images selected in the multiple times.

According to an embodiment of present application, the determining an image related to an untrusted click includes one of the following steps: determining the untrusted click based on a total number of clicks and/or a click ratio between different image classifications; clustering the at least one image into at least one classification, and determining a click on an image as the untrusted click, in a case that the number of images in the classification of the clicked image does not satisfy a predetermined condition, or in a case that a difference and/or ratio between the number of images in the classification of the clicked image and that in a classification with the largest number of images does not satisfy a predetermined condition; and classifying the at least one image into at least one classification based on a visual entity, and determining a click on an image as the untrusted click, in a case that the number of images in the visual-entity-based classification of the clicked image does not satisfy a predetermined condition, or in a case that a difference and/or ratio between the number of images in the visual-entity-based classification of the clicked image and that in a visual-entity-based classification with the largest number of images does not satisfy a predetermined condition.

According to another aspect of the present application, a training data acquisition device is provided, applied to a classifier and including: a search target acquiring unit configured to obtain an image search target according to an input of a user; an image providing unit configured to provide images to the user according to the image search target, to display the images; and a training data determining unit configured to select at least one image from the displayed images, and determine a target-classification pair as training data according to the at least one image; wherein the target-classification pair includes the image search target and an entity-based classification of the at least one image.

According to an embodiment of present application, the training data determining unit further includes: an image selecting subunit configured to select at least one image from the displayed images multiple times; a pair determining subunit configured to determine the target-classification pair for the at least one image each time; and a first determining subunit configured to group the target-classification pairs to obtain a target-classification group, and determine the target-classification group as training data, wherein the target-classification group comprises the image search target, and the entity-based classifications comprised in the determined target-classification pairs. And the training data determining unit further comprises: a second click determining subunit configured to determine an image related to an untrusted click each time; a second filtering subunit configured to filter out the image related to the untrusted click from the at least one image selected each time, and determine the target-classification pairs according to a filtering result; and a third determining subunit configured to evaluate accuracy of each of the target-classification pairs; and determine the training data according to the accuracy of each of the target-classification pairs According to an embodiment of present application, the training data determining unit further includes: a first click determining subunit configured to determine an image related to an untrusted click; a first filtering subunit configured to filter out the image related to the untrusted click from the at least one image, and determine the target-classification pair according to a filtering result; and a second determining subunit configured to evaluate accuracy of the target-classification pair, and determine the training data according to the accuracy.

According to an embodiment of present application, the training data determining unit performs the determining an image related to an untrusted click by one of the following steps: determining the untrusted click based on a total number of clicks and/or a click ratio between different image classifications; clustering the at least one image into at least one classification, and determining a click on an image as the untrusted click, in a case that the number of images in the classification of the clicked image does not satisfy a predetermined condition, or in a case that a difference and/or ratio between the number of images in the classification of the clicked image and that in a classification with the largest number of images does not satisfy a predetermined condition; and classifying the at least one image into at least one classification based on a visual entity, and determining a click on an image as the untrusted click, in a case that the number of images in the visual-entity-based classification of the clicked image does not satisfy a predetermined condition, or in a case that a difference and/or ratio between the number of images in the visual-entity-based classification of the clicked image and that in a visual-entity-based classification with the largest number of images does not satisfy a predetermined condition.

According to yet another aspect of the present application, there is provided an image search server, the image search server including: one or more processors; storage device, for storing one or more programs; when the one or more programs are executed by the one or more processors, the one or more processors are enabled to implement the claimed methods.

According to an aspect of the present application, there is provided a computer readable storage medium storing a computer program, wherein the program is executed by a processor to implement the claimed methods.

According to the embodiments of the present application, larger number of high-quality training data can be obtained, thus facilitating to improve the performance of a classifier.

BRIEF DESCRIPTION OF THE DRAWINGS

The same reference numerals in the drawings will be used to refer to the same or like parts or elements throughout the drawings, unless specified otherwise. These drawings may not be necessarily drawn according to the scales. It should be understood that these drawings only depict some embodiments of the present application, and shall not be regarded as limiting to the scope of the present application.

DETAILED DESCRIPTION OF THE EMBODIMENTS

In the following, only some embodiments are briefly described. As can be recognized by those skilled in the art, various modifications may be made to the described embodiments without departing from the spirit or scope of the present application. Therefore, the drawings and the description are substantially regarded as exemplary intrinsically rather than restrictive.

Figure 1:
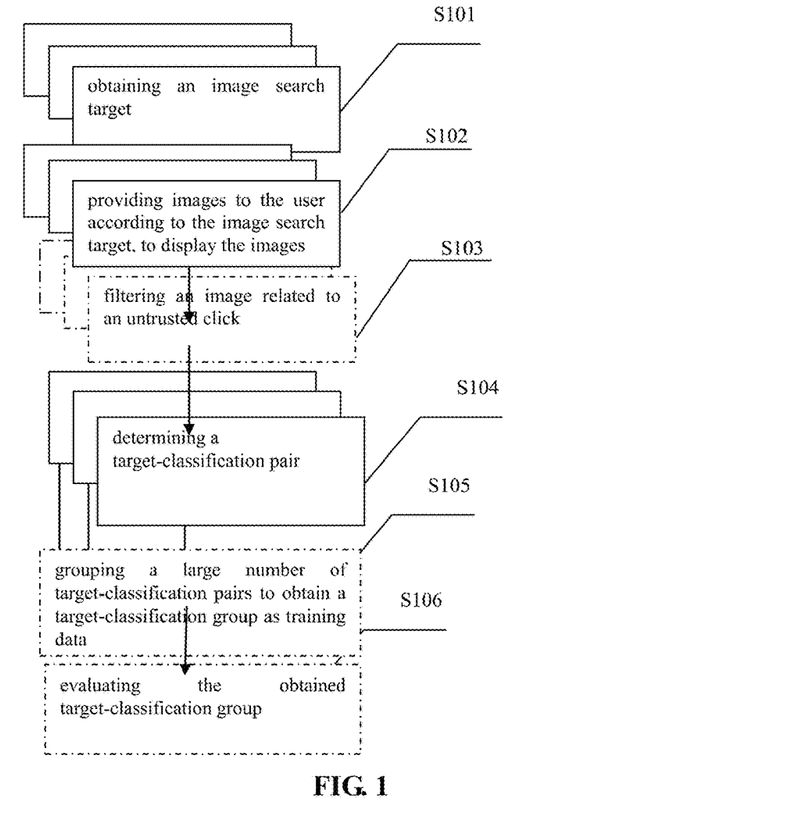
FIG. 1 shows a schematic flow chart illustrating a training data acquisition method according to an embodiment of the present application.

FIG. 1 is a schematic flow chart illustrating a training data acquisition method according to an embodiment of the present application. As shown in FIG. 1, according to an embodiment of the present application, firstly, in step S101, an image search target is obtained. The search target may be obtained according to the input by a user with a computer, and the search target input by the user is usually presented in the form of text. For example, text and emoji entered in a search bar may be used. The user may also conduct a search by double-clicking text, emoji, or an image on a web page, or by a voice input. In the step S101, the search target is obtained according to the input of the user. In the step S101, certain processing on the search target may be performed, such as removing a space, performing image-to-text or audio-to-text conversion, and the like.

Then in step S102, images are provided to the user according to the image search target, to display the images. The images may be provided by searching images according to the text in the search system and displaying the searched images to the user. The images may be sent to the computer that receives the input of the user, to display the image on it.

Then, in step S103, an image related to an untrusted click is filtered, in order to filter out an image if a click on the image by the user is determined to be untrusted. According to an embodiment, the image is filtered by analyzing a click rate, and specifically by distinguishing a trusted click from an untrusted click based on a total number of clicks and/or a click ratio between different objects clicked. See the following documents:

Learning Query and Document Relevance from a Web-scale Click Graph

S Jiang, Y Hu, C Kang, T Daly Jr, D Yin . . . —Proceedings of the 39th . . . , 2016-dl.acm.org According to another embodiment, the images that are clicked by the user for the search target are clustered into at least one classification. According to the result of the clustering, a click is determined to be an untrusted click, in the case that the number of images in the classification of the clicked image is smaller than a threshold, or in the case that a difference and/or ratio between the number of images in the classification of the clicked image and that in a classification with a larger number of images is smaller than a threshold. For example, the input search target is "Catwoman image", and the user clicks 10 images in total, of which 9 images are related to the Catwoman in the Batman movies and 1 image is a cat image. Then after clustering, there are 9 images in the first classification and one image in the second classification. The number of images in the second classification is one-ninth of that in the first classification, smaller than a threshold (e.g., 15%), and thus the click related to the second classification is determined to be an untrusted click. This method may be called a method of analyzing by clustering. According to yet another embodiment, a visual-entity-based classification is provided in the attributes of a displayed image, such as a cat, a dog, people, a tree, a flower, the sun, and the moon. A further classification may also be provided. For example, under the people classification, there may be sub-classifications such as a man, a women, a child, an elderly person, a maid, a student, and the like, obtained according to different classifying criteria. In accordance with these classifications, the clicked images are classified. For example, if in the 10 clicked images, 9 of them belong to the classification of people, and 1 belongs to the classification of an animal or a cat or a dog, then according to the conditions set for the classifications, for example, the condition that a click is determined to be an untrusted click on an image in a case that a difference of the number of images in the classification of the clicked image with that in a classification with the largest number of images is greater than a threshold, or a ratio between the above two numbers is smaller than a threshold, the click on the cat image may be determined to be an untrusted click. Such a method can be called a visual-entity-based classifying method. In the method of analyzing by clustering and the visual-entity-based classifying method, a further predetermined condition may be applied in order to determine whether a click is untrusted. For example, a click on an image may be determined to be a trusted click in a case that the predetermined condition is satisfied, and a click on an image may be determined to be an untrusted click in a case that the predetermined condition is not satisfied. It should be noted that in some embodiments this filtering step may be omitted.

Next, in step S104, a target-classification pair is determined, wherein the target-classification pair includes the image search target and an entity-based classification of the selected image. After filtering out the untrusted clicks, the search target will be associated with a classification of at least one image clicked by the user according to the search target. The classification may be obtained by clustering, for example, or may be previously labeled into each image (may be written into attributes of an image in advance). For example, in the above example, a pair of <Catwoman image, Catwoman heroine> may be obtained. Such classifications of these images are called visual-entity-based classifications. A visual-entity-based classification may be obtained by calculating according to an existing image recognition model (for example, see A. Berg, J. Deng, and L. Fei-Fei. Large scale visual recognition challenge 2010. IMAGENET.ORG. 2010.). The visual-entity-based classification of each image may be obtained in advance and recorded in its attribute.

A single image may correspond to more than one classification in a visual-entity-based classification system (assuming 1000 classification included). For example, an image may correspond to the classification of [thunder, storm], and another may correspond to the classification of [drama]. Each image may correspond to more than one classification. Or rather, an image may more likely correspond to several of the 1000 classifications.

Then, in step S105, a large number of target-classification pairs obtained from step 104 is grouped to obtain a target-classification group, and the target-classification group is set as the training data, wherein the target-classification group includes the image search target, and the entity-based classifications included in the determined target-classification pairs. Since steps 101 to 104 are performed lots of times, and different users may select different images, then after grouping, an identical search target may correspond to different image classifications. Take the search target "thunderstorm image" as an example, a first user may select at least one image corresponding to a natural thunderstorm, while a second user may select at least one image corresponding to the drama of Thunderstorm. As such, through the grouping of large quantity of data, a target-classification group based on these target-classification pairs may be obtained. For example, <thunderstorm image, 75% of natural thunderstorm, and 25% of drama Thunderstorm> may be obtained. Here, 75% and 25% are respectively a ratio of the number of images in each visual-entity-based classification included in the determined target-classification pairs to the number of images selected in the multiple times. For example, if a total of 100 images that correspond to the image search target <thunder image> are collected, of which 75 images belong to the natural thunderstorm classification and 25 images belong to the drama Thunderstorm classification, then the above result may be obtained after grouping. As mentioned earlier, a single image may corresponding to more than one classification in a visual-entity-based classification system for an image. After grouping, a group including more than one classification will also be obtained, wherein there may be larger numbers of images in certain classifications than in other classifications. These numerical values are all exemplary and are not intended to limit the protection scope of the present application.

The target-classification pairs obtained in step S104 may be directly used as the training data, and thus in some embodiments, the step S105 may be omitted. However, by performing step S105, better training samples may be obtained.

Finally, in step S106, evaluating the obtained target-classification group is performed. In an embodiment in which step S105 is omitted, the obtained target-classification pair is evaluated. For example, some of the obtained training data may be extracted to check whether it is accurate. For example, the checking may be performed by checking whether the text showing the user's search target on an image implies the requirements for the corresponding classification, to obtain an accuracy rate. If the accuracy rate is lower than a threshold, the obtained group will be abandoned, and classifying may be performed once again. A pair (group) with a satisfactory evaluation result will be determined as training data for a classifier.

The obtained training data may be used for various classifiers in the related art. Due to the fact that more training data may be obtained by the methods according to embodiments of the present application, and the target-classification group, used as the training data, actually reflects a direct correlation between the image and the search target per se, thus the correlation between the text of the image search target and the requirements of the visual-entity-based classification of the image may be directly determined. Such a direct correlation may be applied to image search and sorting, which significantly improves the correlation and the existing text-based image sorting systems.

Training data acquisition device for a classifier according to various embodiments of the present application will be described below with reference to the accompanying drawings. The foregoing description of the methods can be used to better understand training data acquisition device for a classifier of various embodiments of the present application.

Figure 2:
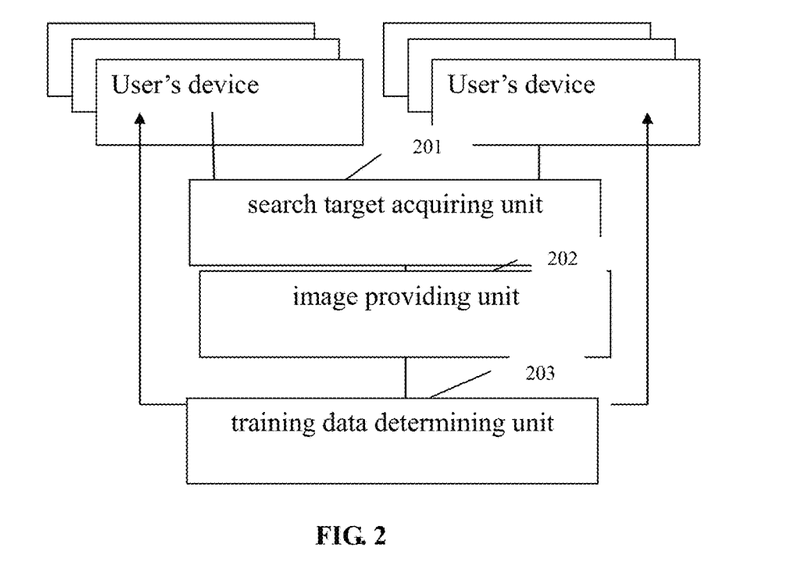
FIG. 2 shows a schematic block diagram illustrating a training data acquisition device according to an embodiment of the present application.

FIG. 2 shows a schematic block diagram illustrating a training data acquisition device according to an embodiment of the present application. As shown in FIG. 2, according to an embodiment of the present application, the training data acquisition device includes a search target acquiring 201, an image providing unit 202, and a training data determining unit 203.

The search target acquiring unit 201 is configured to obtain an image search target, by receiving the user's input from the user's computer. The image search target of the user is usually in the form of text. For example, texts and emoji entered in the search box may be used. The user may also conduct a search by double-clicking on texts, emoji, or images on a web page, or by inputting voices. The search target acquiring unit 201 obtains an image search target based on the user's input. The search target acquiring unit 201 may perform certain processing on the search target, such as removing a space, performing image or audio-to-text conversion, and the like.

The image providing unit 202 is configured to provide images to the user according to the image search target obtained by the search target acquiring unit 201, to display the images; and is further configured to search an image which corresponding to the text in the search system and provide the searched image to the user. The displayed image can be provided, for example, by sending it to a computer that receives the user's input.

The training data determining unit 203 is configured to select at least one image from the displayed images, and determine a target-classification pair as training data according to the at least one image; wherein the target-classification pair includes the image search target and an entity-based classification of the at least one image.

Figure 3:
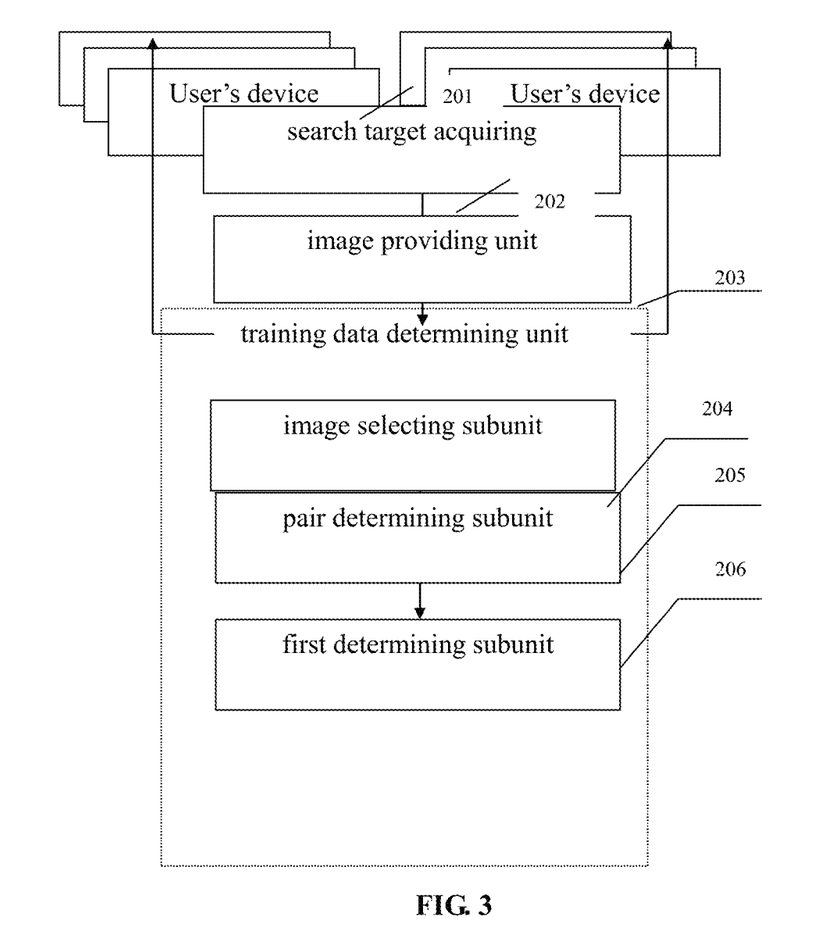
FIG. 3 shows a schematic block diagram illustrating a training data acquisition device according to another embodiment of the present application.

FIG. 3 shows a schematic block diagram illustrating a training data acquisition device according to another embodiment of the present application.

As shown in FIG. 3, the training data acquisition device according to the embodiment shown in FIG. 3 differs from those according to the embodiment shown in FIG. 2, in that the training data determining unit further includes an image selecting subunit 204, a pair determining subunit 205, and a first determining subunit 206. The search target acquiring unit 201, the image providing unit 202, and the training data determining unit 203 can refer to the description made with reference to FIG. 2.

The image selecting subunit 204 is configured to select at least one image from the displayed images multiple times.

The pair determining subunit 205 is configured to determine the target-classification pair for the at least one image each time.

The first determining subunit 206 is configured to group the target-classification pairs to obtain a target-classification group, and determine the target-classification group as training data, wherein the target-classification group includes the image search target, and the entity-based classifications included in the determined target-classification pairs.

The training data acquisition device may further includes a first click determining subunit configured to determine an image related to an untrusted click;

a first filtering subunit configured to filter out the image related to the untrusted click from the at least one image, and determine the target-classification pair according to a filtering result; and a second determining subunit configured to evaluate accuracy of the target-classification pair or of the target-classification group, and determine the training data according to the accuracy.

The determining of an untrusted click is performed by a click-rate analysis method, a visual-entity-based classifying method, or a clustering method. These methods can by utilized independently or in combination with each other.

In a specific embodiment, the click determining subunit, the training data acquisition device may not include all of the first determining subunit 206, and the second determining subunit 206, by may include only one or two of them. Without the first determining subunit, the second determining unit evaluates the obtained target-classification pair.

Although these training data obtained according to the embodiments of the present application can be applied to various classifiers in the related art, however, the classifier preferably utilizes a training model in a deep convolutional neural network to classify images into at least one n-dimensional visual-entity-based classification according to the search target.

A convolutional network is essentially an input-to-output mapping, which may be used based on a large number of mappings between inputs and outputs without the need for any precise mathematical expressions between an input and an output. As long as obtaining a convolutional network by training with a known model, the obtained network then may be used for mapping between an input and an output. For the convolutional network, tutor training is performed, and thus the sample set consists of a vector pair, for example, in a form of <input vector, ideal output vector>. All these vector pairs should originate from an actual "running" result of the system to be simulated by the network. They may be sampled from the actual-running system. Before starting training, all weights used should be initialized with different small random numbers. A "small random number" is used to ensure that the network will not enter into a saturation state due to a large weight, which will result in a training failure; "different small random numbers" are used to ensure that the network can be obtained by learning normally. For further demonstration of the training model used in a deep convolutional neural network, please refer to: "Research on the Applications of Convolutional Neural Network in Image Recognition", 2012, Master Thesis, Zhejiang University; "Convolutional Neural Network Research and Applications", 2013, Master Thesis, Nanjing Forestry University; "Convolutional Neural Network and Its Applications", 2014, Master Thesis, Dalian University of Technology; "Research on Deep Learning Algorithm and Applications Based on Convolutional Neural Networks", 2014, Master Thesis, Zhejiang Industrial and Trade University, etc.

In an image search system, a feature design and network infrastructure modulation may be performed firstly, and then the classifier may be obtained by training. If the effect of the classifier is satisfactory, the training of the classifier can be ended. If the effect is not satisfactory otherwise, the steps of feature design and network infrastructure modulation, as well as training, may be repeated until the effect are satisfactory.

The technical solution framework provided by the embodiments of the present application may be applied to all vertical and general search engine systems.

Figure 4:
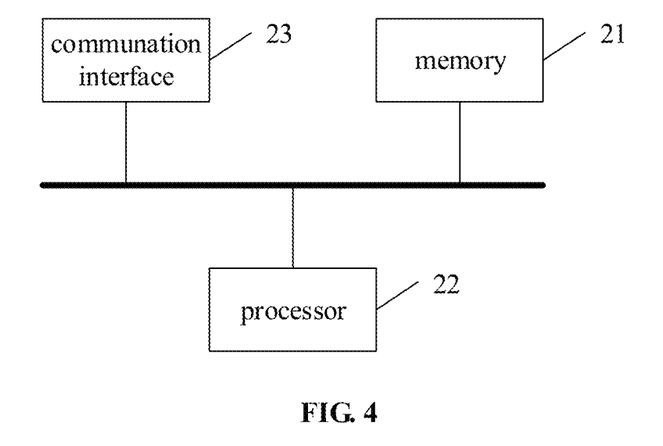
FIG. 4 shows a schematic block diagram illustrating an image search server according to another embodiment of the present application.

An embodiment of the present application further provides an image search server. As shown in FIG. 4, the image search server includes: a memory 21 and a processor 22. The memory 21 stores a computer program that can run on the processor 22. When the processor 22 executes the computer program, training data acquisition methods for a classifier in the above embodiments are implemented. The number of the memory 21 and the processor 22 may be one or more.

The device also includes:

A communication interface 23, used for communication between the memory 21 and the processor 22.

The memory 21 may include a high speed RAM memory, and may also include a non-volatile memory such as at least one disk memory.

If the memory 21, the processor 22, and the communication interface 23 are independently implemented, the memory 21, the processor 22, and the communication interface 23 may be connected to one another through the bus and complete mutual communication therein. The bus may be an Industry Standard Architecture (ISA) bus, a Peripheral Component Interconnect (PCI) bus, an Extended Industry Standard Component (EISA) bus, or the like. The bus can be divided into an address bus, a data bus, a control bus, and the like. For the purpose of ease of illustration, only one thick line is shown in FIG. 4, but it does not necessarily mean that there is only one bus or only one type of bus.

Optionally, in a specific implementation, if the memory 21, the processor 22, and the communication interface 23 are integrated on one chip, the memory 21, the processor 22, and the communication interface 23 can complete mutual communication through the internal interfaces.

In the description of the present specification, the description referring to the terms "one embodiment", "some embodiments", "an example", "a specific example", or "some examples" and the like means particular features, structures, materials, or characteristics included in at least one embodiment or example of present application described in combination with the embodiment or example. Furthermore, the specific features, structures, materials, or characteristics described may be combined in any suitable manner in any one or more of the embodiments or examples. In addition, different embodiments or examples described in this specification and features of different embodiments or examples may be incorporated and combined by those skilled in the art without mutual contradiction.

In addition, the terms "first" and "second" are used for descriptive purposes only and are not to be construed as indicating or implying relative importance or implicitly indicating the number of indicated technical features. Thus, features defining "first" and "second" may explicitly or implicitly include at least one of the features. In the description of the present application, "a plurality of" means two or more, unless expressly limited otherwise.

Any process or method descriptions described in flowcharts or otherwise herein may be understood as representing modules, segments or portions of code that include one or more executable instructions for implementing the steps of a particular logic function or process. The scope of the preferred embodiments of the present application includes additional implementations where the functions may not be performed in the order shown or discussed, including according to the functions involved, in substantially simultaneous or in reverse order, which should be understood by those skilled in the art to which the embodiment of the present application belongs.

Logic and/or steps, which are represented in the flowcharts or otherwise described herein, for example, may be thought of as a sequencing listing of executable instructions for implementing logic functions, which may be embodied in any computer-readable medium, for use by or in connection with an instruction execution system, device, or device (such as a computer-based system, a processor-included system, or other system that fetch instructions from an instruction execution system, device, or device and execute the instructions). For the purposes of this specification, a "computer-readable medium" may be any device that can contain, store, communicate, propagate, or transport the program for use by or in connection with the instruction execution system, device, or device. The computer-readable medium described in the embodiments of present application may be a computer-readable signal medium or a computer-readable storage medium or any combination thereof. More specific examples (not a non-exhaustive list) of the computer-readable media include the following: electrical connections (electronic devices) having one or more wires, a portable computer disk cartridge (magnetic device), random access memory (RAM), read only memory (ROM), erasable programmable read only memory (EPROM or flash memory), optical fiber devices, and portable read only memory (CDROM). In addition, the computer-readable medium can even be paper or other suitable medium upon which the program can be printed, as it may be read, for example, by optical scanning of the paper or other medium, followed by editing, interpretation or, where appropriate, process otherwise to electronically obtain the program, which is then stored in a computer memory.

It should be understood that various portions of the present application may be implemented by hardware, software, firmware, or a combination thereof. In the above embodiments, multiple steps or methods may be implemented in software or firmware stored in memory and executed by a suitable instruction execution system. For example, if implemented in hardware, as in another embodiment, they may be implemented using any one or a combination of the following techniques well known in the art: discrete logic circuits having a logic gate circuit for implementing logic functions on data signals, application specific integrated circuits with suitable combinational logic gate circuits, programmable gate arrays (PGA), field programmable gate arrays (FPGAs), and the like.

Those skilled in the art may understand that all or some of the steps carried in the methods in the foregoing embodiments may be implemented by a program instructing relevant hardware. The program may be stored in a computer-readable storage medium, and when executed, one of the steps of the method embodiment or a combination thereof is included.

In addition, each of the functional units in the embodiments of the present application may be integrated in one processing module, or each of the units may exist alone physically, or two or more units may be integrated in one module. The above-mentioned integrated module can be implemented in the form of hardware or in the form of software functional module. When the integrated module is implemented in the form of a software functional module and is sold or used as an independent product, the integrated module may also be stored in a computer-readable storage medium. The storage medium may be a read only memory, a magnetic disk, an optical disk, or the like.

The foregoing descriptions are merely specific embodiments of the present application, but not intended to limit the protection scope of the present application. Those skilled in the art may easily conceive of various changes or modifications within the technical scope disclosed herein, all these should be covered within the protection scope of the present application. Therefore, the protection scope of the present application should be subject to the protection scope of the claims.

What is claimed is:

1. A training data acquisition method, comprising:
receiving an image search target from a computer;
sending images to the computer according to the image search target, to display the images on the computer; and
selecting at least one image from the displayed images and determining a target-classification pair as training data according to the at least one image; wherein the target-classification pair comprises the image search target and an entity-based classification of the at least one image,
wherein the selecting at least one image from the displayed images and determining a target-classification pair as training data comprises:
determining an image related to an untrusted click;
filtering out the image related to the untrusted click from the at least one image, and determining the target-classification pair according to a filtering result; and
evaluating accuracy of the target-classification pair, and determining the training data according to the accuracy, and
wherein the determining an image related to an untrusted click comprises:
clustering the at least one image into at least one classification, and determining a click on an image as the untrusted click, in a case that the number of images in the classification of the clicked image does not satisfy a predetermined condition, or in a case that a difference and/or ratio between the number of images in the classification of the clicked image and that in a classification with the largest number of images does not satisfy a predetermined condition; and
classifying the at least one image into at least one classification based on a visual entity, and determining a click on an image as the untrusted click, in a case that the number of images in the visual-entity-based classification of the clicked image does not satisfy a predetermined condition, or in a case that a difference and/or ratio between the number of images in the visual-entity-based classification of the clicked image and that in a visual-entity-based classification with the largest number of images does not satisfy a predetermined condition.

2. The training data acquisition method according to claim 1, wherein the selecting at least one image from the displayed images, and determining a target-classification pair as training data further comprises:
selecting at least one image from the displayed images multiple times;
determining the target-classification pair for the at least one image each time; and
grouping the target-classification pairs to obtain a target-classification group, and determining the target-classification group as training data, wherein the target-classification group comprises the image search target, and the entity-based classifications comprised in the determined target-classification pairs.

3. The training data acquisition method according to claim 1, wherein the selecting at least one image from the displayed images, and determining a target-classification pair as training data further comprises:
determining an image related to an untrusted click each time;
filtering out the image related to the untrusted click from the at least one image selected each time, and determining the target-classification pairs according to a filtering result; and
evaluating accuracy of each of the target-classification pairs; and determining the training data according to the accuracy of each of the target-classification pairs.

4. The training data acquisition method according to claim 2, wherein the selecting at least one image from the displayed images, and determining a target-classification pair as training data further comprises:
determining an image related to an untrusted click each time;
filtering out the image related to the untrusted click from the at least one image selected each time, and determining the target-classification pairs according to a filtering result; and
evaluating accuracy of each of the target-classification pairs; and determining the training data according to the accuracy of each of the target-classification pairs.

5. The training data acquisition method according to claim 2, wherein the target-classification group comprises a ratio of the number of images in each entity-based classification comprised in the determined target-classification pairs to the number of images selected in the multiple times.

6. A training data acquisition device, comprising:
one or more processors; and
a storage device configured for storing one or more programs, wherein
the one or more programs are executed by the one or more processors to enable the one or more processors to perform:
receiving an image search target from a computer;
sending images to the computer according to the image search target, to display the images on the computer; and
selecting at least one image from the displayed images and determining a target-classification pair as training data according to the at least one image; wherein the target-classification pair comprises the image search target and an entity-based classification of the at least one image,
wherein the one or more programs, when executed by the one or more processors, enable the one or more processors further to perform:
determining an image related to an untrusted click;
filtering out the image related to the untrusted click from the at least one image, and determining the target-classification pair according to a filtering result; and
evaluating accuracy of the target-classification pair, and determining the training data according to the accuracy, and
wherein the one or more programs, when executed by the one or more processors, enable the one or more processors further to perform:
clustering the at least one image into at least one classification, and determining a click on an image as the untrusted click, in a case that the number of images in the classification of the clicked image does not satisfy a predetermined condition, or in a case that a difference and/or ratio between the number of images in the classification of the clicked image and that in a classification with the largest number of images does not satisfy a predetermined condition; and classifying the at least one image into at least one classification based on a visual entity, and determining a click on an image as the untrusted click, in a case that the number of images in the visual-entity-based classification of the clicked image does not satisfy a predetermined condition, or in a case that a difference and/or ratio between the number of images in the visual-entity-based classification of the clicked image and that in a visual-entity-based classification with the largest number of images does not satisfy a predetermined condition.

7. The training data acquisition device according to claim 6, wherein the one or more programs, when executed by the one or more processors, enable the one or more processors further to perform:
  selecting at least one image from the displayed images multiple times;
  determining the target-classification pair for the at least one image each time; and
  grouping the target-classification pairs to obtain a target-classification group, and determining the target-classification group as training data, wherein the target-classification group comprises the image search target, and the entity-based classifications comprised in the determined target-classification pairs.

8. The training data acquisition device according to claim 6, wherein the one or more programs, when executed by the one or more processors, enable the one or more processors further to perform:
  determining an image related to an untrusted click each time;
  filtering out the image related to the untrusted click from the at least one image selected each time, and determining the target-classification pairs according to a filtering result; and
  evaluating accuracy of each of the target-classification pairs; and determining the training data according to the accuracy of each of the target-classification pairs.

9. The training data acquisition device according to claim 7, wherein the one or more programs, when executed by the one or more processors, enable the one or more processors further to perform:
  determining an image related to an untrusted click each time;
  filtering out the image related to the untrusted click from the at least one image selected each time, and determining the target-classification pairs according to a filtering result; and
  evaluating accuracy of each of the target-classification pairs; and determining the training data according to the accuracy of each of the target-classification pairs.

10. The training data acquisition method according to claim 7, wherein the target-classification group comprises a ratio of the number of images in each entity-based classification comprised in the determined target-classification pairs to the number of images selected in the multiple times.

11. A non-transitory computer readable storage medium storing a computer program, wherein the program is executed by a processor to perform:
  receiving an image search target from a computer;
  sending images to the computer according to the image search target, to display the images on the computer; and
  selecting at least one image from the displayed images and determining a target-classification pair as training data according to the at least one image; wherein the target-classification pair comprises the image search target and an entity-based classification of the at least one image,
  wherein the selecting at least one image from the displayed images and determining a target-classification pair as training data comprises:
  determining an image related to an untrusted click;
  filtering out the image related to the untrusted click from the at least one image, and determining the target-classification pair according to a filtering result; and
  evaluating accuracy of the target-classification pair, and determining the training data according to the accuracy, and
  wherein the determining an image related to an untrusted click comprises:
  clustering the at least one image into at least one classification, and determining a click on an image as the untrusted click, in a case that the number of images in the classification of the clicked image does not satisfy a predetermined condition, or in a case that a difference and/or ratio between the number of images in the classification of the clicked image and that in a classification with the largest number of images does not satisfy a predetermined condition; and
  classifying the at least one image into at least one classification based on a visual entity, and determining a click on an image as the untrusted click, in a case that the number of images in the visual-entity-based classification of the clicked image does not satisfy a predetermined condition, or in a case that a difference and/or ratio between the number of images in the visual-entity-based classification of the clicked image and that in a visual-entity-based classification with the largest number of images does not satisfy a predetermined condition.

12. The non-transitory computer readable storage medium according to claim 11, wherein the program, when executed by the processor, causes the processor to perform:
  selecting at least one image from the displayed images multiple times;
  determining the target-classification pair for the at least one image each time; and
  grouping the target-classification pairs to obtain a target-classification group, and determining the target-classification group as training data, wherein the target-classification group comprises the image search target, and the entity-based classifications comprised in the determined target-classification pairs.

13. The non-transitory computer readable storage medium according to claim 11, wherein the program, when executed by the processor, causes the processor to perform:
  determining an image related to an untrusted click each time;
  filtering out the image related to the untrusted click from the at least one image selected each time, and determining the target-classification pairs according to a filtering result; and
  evaluating accuracy of each of the target-classification pairs; and determining the training data according to the accuracy of each of the target-classification pairs.

14. The non-transitory computer readable storage medium according to claim 12, wherein the program, when executed by the processor, causes the processor to perform:
  determining an image related to an untrusted click each time;

filtering out the image related to the untrusted click from the at least one image selected each time, and determining the target-classification pairs according to a filtering result; and evaluating accuracy of each of the target-classification pairs; and determining the training data according to the accuracy of each of the target-classification pairs.

15. The non-transitory computer readable storage medium according to claim 12, wherein the target-classification group comprises a ratio of the number of images in each entity-based classification comprised in the determined target-classification pairs to the number of images selected in the multiple times.

\* \* \* \* \*